(12) United States Patent
Povey et al.

(10) Patent No.: US 11,460,870 B2
(45) Date of Patent: Oct. 4, 2022

(54) DEVICE FOR CONTROLLING FLUID FLOW

(71) Applicant: OFIP LIMITED, Oxford (GB)

(72) Inventors: Thomas Povey, Oxford (GB); Matthew Collins, Oxford (GB)

(73) Assignee: OFIP LIMITED, Oxford (GB)

( * ) Notice: Subject to any disclaimer, the term of this patent is extended or adjusted under 35 U.S.C. 154(b) by 0 days.

(21) Appl. No.: 17/036,851

(22) Filed: Sep. 29, 2020

(65) Prior Publication Data

US 2021/0011499 A1 Jan. 14, 2021

Related U.S. Application Data

(63) Continuation of application No. 16/096,535, filed as application No. PCT/GB2017/051147 on Apr. 25, 2017, now Pat. No. 10,838,439.

(30) Foreign Application Priority Data

Apr. 26, 2016 (GB) ..................................... 1607214

(51) Int. Cl.
| | |
|---|---|
| *G05D 16/16* | (2006.01) |
| *G05D 16/10* | (2006.01) |
| *F16K 1/12* | (2006.01) |

(52) U.S. Cl.
CPC ........... *G05D 16/166* (2013.01); *F16K 1/126* (2013.01); *G05D 16/106* (2013.01)

(58) Field of Classification Search
CPC ..... F16K 1/126; F16K 31/124; G05D 16/166; G05D 16/106

(Continued)

(56) References Cited

U.S. PATENT DOCUMENTS 1,710,635 A * 4/1929 Wertz .................... F16K 15/026
137/543.19
3,092,133 A * 6/1963 Clark ...................... F16K 1/126
137/220

(Continued)

FOREIGN PATENT DOCUMENTS

| CN | 102089725 A | 6/2011 |
|---|---|---|
| CN | 102606554 A | 7/2012 |

(Continued)

OTHER PUBLICATIONS

Author Unknown, "Pressure Reducing Valve: DN-DN300, Ductile Iron Epoxy Coated Pilot Assisted (1-7), (2-10) or (4-12) Bar," Product Data Sheet, Type BFR-DE, published as early as Dec. 2015, Z-Tide Valves Industrial Co., Ltd, 1 page.

(Continued)

*Primary Examiner* — Jessica Cahill
(74) *Attorney, Agent, or Firm* — Withrow & Terranova, P.L.L.C.; Vincent K. Gustafson

(57) ABSTRACT

A device is provided for controlling the flow of a fluid through a conduit from an upstream side to a downstream side of the device. The device includes a valve aperture, a cylindrical mounting member on the downstream side of the valve aperture, a valve member on the outside of the cylindrical mounting member that moves reciprocally to open and close the valve aperture, a control volume defined between the cylindrical mounting member and the valve member, an arrangement for introducing a control pressure into the control volume, and a seal between the outer surface of the cylindrical mounting member and the inner surface of the valve member that substantially seals the control volume. The valve member is acted on by the pressure of the upstream side ($P_1$) and the control pressure ($P_4$) so as to be moved by the difference between these pressures.

16 Claims, 4 Drawing Sheets

(58) Field of Classification Search
USPC .............................. 137/487, 505.3, 219–220
See application file for complete search history.

(56) References Cited

U.S. PATENT DOCUMENTS

| | | | | |
|---|---|---|---|---|
| 3,297,047 | A * | 1/1967 | Sime | F16K 31/406 137/220 |
| 3,515,165 | A * | 6/1970 | Zadoo | G05D 16/106 137/220 |
| 3,521,661 | A * | 7/1970 | Staiger | F04D 27/023 137/220 |
| 3,587,622 | A | 6/1971 | Hardison | |
| 3,792,713 | A * | 2/1974 | Zadoo | F16K 31/363 137/486 |
| 3,865,128 | A * | 2/1975 | Zadoo | F02C 9/18 137/220 |
| 4,431,020 | A | 2/1984 | Kowalski | |
| 4,681,130 | A | 7/1987 | Tabor | |
| 5,000,221 | A | 3/1991 | Palmer | |
| 5,603,352 | A | 2/1997 | Tavor | |
| 5,655,562 | A * | 8/1997 | Palmer | F24F 13/12 137/114 |
| 5,720,314 | A | 2/1998 | Palmer | |
| 5,769,387 | A | 6/1998 | Pérez C. | |
| 6,029,691 | A | 2/2000 | Tavor | |
| 6,752,168 | B1 | 6/2004 | Ottestad et al. | |
| 6,981,842 | B2 * | 1/2006 | D'Angelo | F04D 27/0215 415/144 |
| 9,033,306 | B2 * | 5/2015 | Kunau | B60C 25/145 251/44 |
| 9,080,832 | B2 | 7/2015 | Brahler, II et al. | |
| 9,086,079 | B2 | 7/2015 | Cho | |
| 9,689,315 | B2 | 6/2017 | Marocchini et al. | |
| 10,266,019 | B2 * | 4/2019 | Kunau | B60C 29/068 |
| 10,823,308 | B1 * | 11/2020 | DeFelice | F16K 31/50 |
| 2011/0068284 | A1 | 3/2011 | Jorgensen | |
| 2017/0016554 | A1 | 1/2017 | Volovec et al. | |
| 2019/0155317 | A1 | 5/2019 | Povey et al. | |

FOREIGN PATENT DOCUMENTS

| | | |
|---|---|---|
| CN | 102889423 A | 1/2013 |
| CN | 103917933 A | 7/2014 |
| CN | 104235446 A | 12/2014 |
| EP | 1205697 A2 | 5/2002 |
| EP | 1727013 B1 | 5/2010 |
| FR | 2305774 A1 | 10/1976 |
| GB | 1096434 A | 12/1967 |
| GB | 1404254 A | 8/1975 |

OTHER PUBLICATIONS

Non-Final Office Action for U.S. Appl. No. 16/096,535, dated Feb. 12, 2020, 16 pages.
Final Office Action for U.S. Appl. No. 16/096,535, dated Jun. 26, 2020, 9 pages.
Advisory Action for U.S. Appl. No. 16/096,535, dated Sep. 1, 2020, 3 pages.
Applicant-Initiated Interview Summary for U.S. Appl. No. 16/096,535, dated Sep. 16, 2020, 3 pages.
Notice of Allowance and Applicant-Initiated Interview Summary for U.S. Appl. No. 16/096,535, dated Sep. 25, 2020, 10 pages.
Intention to Grant for European Patent Application No. 17721427.7, dated Jul. 16, 2019, 68 pages.
Extended European Search Report for European Patent Application No. 19212075.6, dated Feb. 20, 2020, 6 pages.
Search Report for United Kingdom Patent Application No. GB1607214. 2, dated Nov. 28, 2016, 3 pages.
International Search Report and Written Opinion for PCT/GB2017/ 051147, dated Aug. 2, 2017, 17 pages.
International Preliminary Report on Patentability for PCT/GB2017/ 051147, dated Nov. 8, 2018,11 pages.
Decision to Grant for Chinese Patent Application No. 201780025740. 2, dated Feb. 14, 2022, 6 pages.

* cited by examiner

Fig. 2
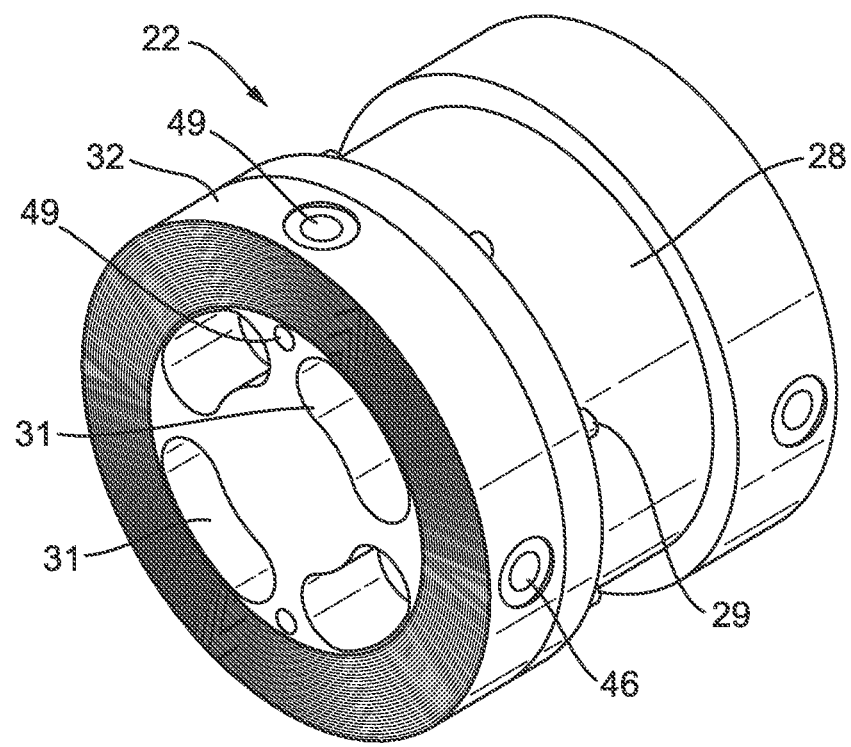
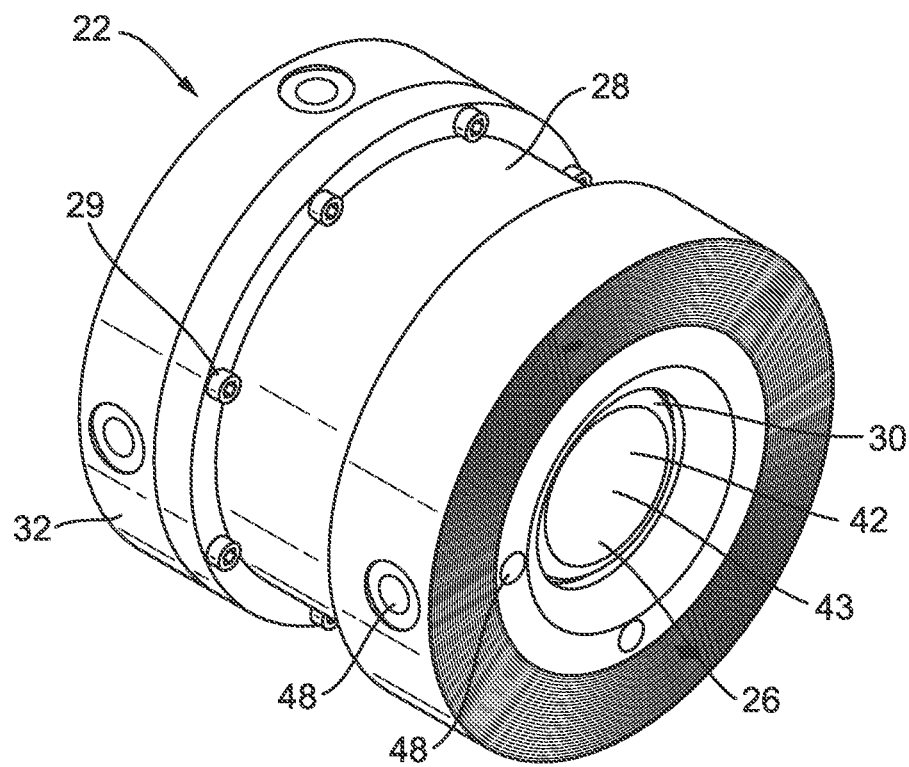

DEVICE FOR CONTROLLING FLUID FLOW

This application is a continuation of U.S. patent application Ser. No. 16/096,535 filed on Oct. 25, 2018, which is a 35 U.S.C. § 371 national phase filing of International Application No. PCT/GB2017/051147 filed on Apr. 25, 2017, and claims the benefit of United Kingdom Patent Application No 1607214.2 filed on Apr. 26, 2016, wherein the disclosures of the foregoing applications are hereby incorporated by reference herein in their respective entireties.

This invention relates to a device for controlling the flow of fluid in a conduit, e.g. for regulating pressure in fluid systems, in particular to a device for controlling a flow rate in a fluid flow stream to deliver a desired output pressure.

In fluid flow systems such as pipes and conduits, e.g. as can be found in many different industrial situations, there is a need to regulate the pressure in a fluid flow stream through the pipe or conduit. In such systems there is an input pressure that may be constant or fluctuating in time and which it is desired to control to a lower target output pressure, which also can be constant or fluctuating.

One example of such devices is a computer controlled pressure regulator in which the position of a valve is adjusted depending on the measured input and output pressures in order to deliver the desired output pressure. Such devices are very complicated, e.g. because of all the control circuitry and associated valve actuation needed to achieve the required sensitivity.

A second example of such devices is a pilot operated pressure regulator, which acts as a pressure regulator amplifier. The pilot regulator provides a control pressure in a small plenum which in turn controls a larger regulator, as it is easier to control a small regulator. Such devices are generally rather large and protrude a long way from the pipework in which they are installed, as well as containing many different moving components, e.g. springs and valves, which require calibration and maintenance. Furthermore, these types of regulators can be relatively high cost, particularly those suitable for high mass flow rates.

It is an object of the invention to provide an improved device for controlling the flow of a fluid through a conduit.

When viewed from a first aspect the invention provides a device for controlling the flow of a fluid through a conduit from an upstream side of the device to a downstream side of the device, the device comprising:

a valve aperture;

a cylindrical mounting member arranged on the downstream side of the valve aperture;

a valve member movably mounted on the outside of the cylindrical mounting member and arranged to move reciprocally to selectively open and close the valve aperture, thereby controlling flow of the fluid through the valve aperture;

a control volume defined between the cylindrical mounting member and the valve member;

an arrangement for introducing a control pressure into the control volume; and a seal arranged between the outer surface of the cylindrical mounting member and the inner surface of the valve member for substantially sealing the control volume;

wherein the valve member is acted on by the pressure of the upstream side and the control pressure so as to be moved by the difference between these pressures.

The present invention provides a device for controlling (e.g. pressure regulating) the flow of fluid through a conduit (e.g. in which the device is placed). The flow of fluid through the device is controlled between an upstream side of the device and a downstream side of the device, with a valve aperture of the device, for example, defining the boundary between the upstream and downstream sides. The flow of fluid through the valve aperture, and thus through the device from the upstream side to the downstream side, is controlled by a valve member that is movably mounted on the outside of a cylindrical mounting member. The cylindrical mounting member is arranged in the device downstream of the valve aperture (and thus preferably the valve member is arranged downstream of the valve aperture) and the valve member is arranged to move reciprocally on the outside of the cylindrical mounting member to selectively open and close the valve aperture.

Between them, the (e.g. end of the) cylindrical mounting member and the valve member define a control volume. A control pressure is introduced into the control volume using a suitable arrangement, with the control volume being substantially sealed by a seal positioned between the outer surface of the cylindrical mounting member and the inner surface of the valve member. The control pressure, as well as the pressure of the fluid on the upstream side of the device, acts on the valve member, so that it is moved by the difference between these pressures.

Thus it will be appreciated that the device (e.g. pressure regulator or control device) of the present invention has a particularly simple design, having (at least in preferred embodiments) only three basic parts: the valve aperture, the cylindrical mounting member and the valve member (which define a, e.g. single, control volume). The only moving part (at least in preferred embodiments) is the valve member. This simplicity helps to provide a robust and reliable device, which may be manufactured inexpensively and compactly, e.g. compared to the complicated, expensive and bulky prior art pressure regulators.

With only three main components, there may only be two tolerances that are necessary to control to provide alignment of the device: that of the cylindrical mounting member with respect to the valve member and that of the cylindrical mounting member with respect to the valve aperture (the latter to help align the valve member with the valve aperture in order to produce an effective seal when closed). Again, this shows the simplicity of the device which helps to provide a robust and reliable device.

Having (e.g. only) a single valve aperture helps to minimize the risk of blockages forming in the device, and providing the seal for the control volume on the outer surface of the cylindrical mounting member (and thus the inner surface of the valve member) helps to maximize the cross sectional surface area of the control volume that acts on the valve member. This thus maximizes the control that is able to be exerted on the valve member and thus the control of the flow of fluid through the valve aperture.

The device and the components thereof may be arranged in any suitable and desired way. In a preferred embodiment the cylindrical mounting member, the valve member and the valve aperture (and also preferably the device itself) are arranged coaxially with respect to each other about an axis. In a preferred embodiment the cylindrical mounting member, the valve member and the valve aperture (and also preferably the device itself) are substantially rotationally symmetric about the axis. Preferably the axis extends in a direction collinearly with the general (e.g. average) direction of fluid flow through the valve aperture.

Preferably the axis of the device is parallel to, e.g. collinear with, the axis of the conduit in which the device is arranged. It will be appreciated that this arrangement allows the device to be easily fitted within an existing pipe, e.g. inserted inside a pipe at a flange or even in a continuous section of pipework, as the largest dimension of the device is likely to be in that in which the valve member moves. Therefore no additional space is required to house the device and it can be retro-fitted rapidly and at low cost in most sections of pipework or at most pipe joints without any significant alteration in the pipework. As has been explained, conventional devices require the pipework layout to be redesigned for the new flow control equipment to be incorporated. Devices in accordance the present invention can therefore significantly reduce the cost and work required to incorporate it into an existing system.

The arrangements mentioned above, in particular, as well as other embodiments, allow devices in accordance with the present invention to facilitate very high mass flows for a given conduit diameter and pressure compared to conventional pressure regulators. This is because of the simple layout of the device, which gives a relatively straight flow path through the device and allows it, in certain configurations, to have a very low minimum pressure drop across the device, compared to the tortuous flow path and multiple moving components in a conventional pressure regulator. This creates a very flexible device which can be used for many different applications.

The valve aperture, through which the flow of fluid is controlled by the valve member and onto which the valve member seals when the valve aperture is closed, preferably defines the boundary between the upstream side and the downstream side of the device. Preferably the device has only a single valve aperture.

The valve aperture may be arranged with respect to the cylindrical mounting member and the valve member, and to the conduit, in any suitable and desired configuration. Preferably, as indicated above, the valve aperture lies in a plane perpendicular to the axis of the cylindrical mounting member and, thus preferably also to the axis of the device. In a preferred embodiment the device comprises a housing, wherein the housing comprises a wall in which the valve aperture is defined. Preferably the housing is attached to (and preferably sealed against) the cylindrical mounting member. Connecting the housing (and thus the valve aperture), e.g. structurally and directly, to the cylindrical mounting member helps to align the valve member precisely with the valve aperture. For example, as outlined above, only the tolerances between the cylindrical mounting member and the housing, and between the cylindrical mounting member and the valve member, may need to be controlled to align the valve member precisely with the valve aperture (e.g. the wall in which the valve aperture is defined).

Preferably the housing comprises an interior volume that substantially surrounds the cylindrical mounting member and the valve member, e.g. the cylindrical mounting member and the valve member are arranged in the interior volume of the housing.

In one embodiment the device is arranged (e.g. in a conventional cast body) with the axis of the device at an angle (e.g. perpendicular) to the axis of the upstream and downstream sides of the conduit. In this embodiment preferably the housing is formed by the wall of the conduit. In this embodiment the device may not include a flange comprising one or more apertures through which the fluid is arranged to flow into the downstream side of the conduit. Instead, the fluid flow may simply exit the device at an angle (e.g. perpendicularly) to the axis of the device into the downstream side of the conduit. However the arrangement of the valve aperture, the cylindrical mounting member and the valve member may comprise the same optional and preferred features as described herein, e.g. in relation to the embodiments in which the axis of the device is coaxial with the conduit.

The valve aperture may have any suitable and desired shape. In a preferred embodiment the valve aperture has a cylindrical shape, e.g. having a circular cross sectional area (in a plane perpendicular to the general direction of fluid flow through the valve aperture, e.g. to the axis of the device). Preferably the longitudinal axis of the cylindrical shape of the valve aperture is collinear with the axis of the device.

In a preferred embodiment the downstream side of the valve aperture has a perpendicular edge, e.g. with an internal surface through the valve aperture that is parallel to the axis of the device. Thus preferably the downstream side of the valve aperture has a planar face in a plane perpendicular to the axis of the device, e.g. against which the valve member engages. Preferably the upstream side of the valve aperture has a cross sectional area that increases, e.g. exponentially, in the upstream direction.

The cylindrical mounting member is arranged on the downstream side of the valve aperture, preferably coaxially with the valve member and the valve aperture. Thus preferably the longitudinal axis of the cylindrical mounting member (i.e. along which the cross sectional area of the cylindrical mounting member is extended) is collinear with the axis of the device. The cylindrical mounting member may have any suitable and desired cross sectional shape (in a directional perpendicular to its axis). Preferably the cylindrical mounting member has the same cross sectional shape as the shape of the valve aperture, e.g. circular. Preferably the cylindrical mounting member comprises a planar end (the end proximal to the valve aperture) against which the (e.g. (inner) end of the) valve member abuts when the valve aperture is fully open.

The cylindrical mounting member may be arranged with respect to the valve aperture and the valve member, and to the conduit, in any suitable and desired configuration. Indeed the device may be mounted in the conduit in any suitable and desired way, e.g. integrally formed with (e.g. a section of) the conduit. However preferably the device is provided as a separate structure within (or with respect to) the conduit and thus in a preferred embodiment the device comprises a flange for mounting the device within (or with respect to) the conduit (e.g. for attaching the device to the conduit), wherein the cylindrical mounting member is attached to, e.g. integrally formed with, the flange. The flange may be integrally formed with the cylindrical mounting member in any suitable and desired way. In a preferred embodiment the flange is integrally machined (e.g. from the same solid block of material) with the cylindrical mounting member. Preferably the flange is radially extending, e.g. in a plane perpendicular to the axis (of the device and/or of the cylindrical mounting member and/or of the conduit in which it is to be mounted).

The flange may be arranged for mounting the device in the conduit, e.g. for suspending the device within the conduit. However preferably the flange is arranged for mounting the device between the upstream and downstream sides of the conduit, e.g. between two sections of the conduit. This may allow the, e.g. radial, size of the device to be maximized and thus helps to maximize the flow capacity of the device.

When the device is arranged to be mounted between two sections of the conduit, e.g. between two flanges of the conduit, the flange (to which the cylindrical mounting member is attached) may solely be used to attach the device to the (e.g. flanges of the) conduit. However in a preferred embodiment the flange and the housing (in which the valve aperture is formed) are arranged for mounting the device between the upstream and downstream sides of the conduit. Preferably the wall (in which the valve aperture is defined) of the housing comprises a flange arranged for mounting the device between the upstream and downstream sides of the conduit, e.g. in addition to the flange to which the cylindrical mounting member is attached. The flange may be integrally formed with the housing in any suitable and desired way. In a preferred embodiment the flange is integrally machined (e.g. from the same solid block of material) with the housing.

Thus in a particularly preferred embodiment the device comprises a flange at either end (one to which the cylindrical mounting member is attached and the other in which the valve aperture is formed) that are arranged for mounting the device between the upstream and downstream sides of the conduit. Preferably the flanges are integrally formed (e.g. integrally machined (e.g. from the same solid block of material)) with the cylindrical mounting member and the valve aperture (e.g. with the housing in which the valve aperture is formed) respectively.

In a preferred embodiment the device is arranged to be mounted (e.g. by means of one or more flanges) between the upstream and downstream sides of the conduit within a flange bolt circle (i.e. between flanges in the upstream and downstream sides of conduit that are held together by bolts).

Preferably the device (and thus the cylindrical mounting member, the valve member and the valve aperture) is arranged to be mounted coaxially within (or with respect to, e.g. between two sections of) the conduit. The cylindrical mounting member may be arranged with respect to the flange in any suitable and desired configuration. Preferably the cylindrical mounting member projects (in the direction of its longitudinal axis) perpendicularly to the plane of the flange. The cylindrical mounting member may project from the flange in a downstream direction or in downstream and upstream directions (i.e. the cylindrical mounting member may extend through the flange in both of these directions) but preferably the cylindrical mounting member projects from the flange in an upstream direction (e.g. preferably the flange forms the downstream extent of the device).

Depending on application the device may be produced with a high shut-off tightness (leak rate as a fraction of the regulator capacity at full travel) or to give complete shut-off. In some applications, however, a lower shut-off tightness might be tolerated (such that there is some leakage from upstream to downstream sides). If the device can be manufactured such that a high shut-off tightness is not required, it removes the need for additional or expensive seals to be incorporated in the device, further decreasing the cost of the device.

In any of the embodiments discussed above with regard to the mounting of the device in an arrangement of pipework, the device could be fitted to a section of pipe or conduit which is then fitted into an existing pipework layout, e.g. by removal of a section of pipe and replacing it with the section of pipe with the device fitted inside or therebetween. This is particularly useful in a complex pipe layout in which it may be difficult to fit the device in situ, but it is feasible to replace a particular section of pipe. The invention therefore extends to a section or sections of pipe (or conduit) comprising the device as recited in the first aspect of the invention, to control the flow of fluid through the conduit.

In a preferred embodiment the housing (in which the valve aperture is formed) is attached to the cylindrical mounting member via the flange, e.g. the housing is attached to the flange (to which the cylindrical mounting member is attached or with which the cylindrical mounting member is integrally formed). The housing may be attached to the flange (or to the cylindrical mounting member) is any suitable and desired way. Preferably the housing is attached to the flange (or to the cylindrical mounting member) using bolts or screws. Preferably the housing is attached to the flange such that the valve aperture is aligned with the valve member.

In a preferred embodiment the housing and the cylindrical mounting member, e.g. the housing and the flange, may be attached to each other so to form a seal therebetween. Thus preferably the flange and the housing each comprise sealing surfaces for sealing the flange against the housing (and, e.g., aligning the valve aperture with the valve member).

The cylindrical mounting member may be arranged in the device and with respect to the conduit in any suitable and desired way to allow fluid to flow through the device and into the downstream side of the conduit after passing through the valve aperture. When the device comprises a flange to which the cylindrical mounting member is attached (e.g. integrally formed with), preferably the flange comprises one or more apertures, e.g. a plurality of apertures, to allow fluid to flow through the flange and into the downstream side of the conduit.

When the housing (in which the valve aperture is formed) is attached to the cylindrical mounting member (e.g. to the flange), the housing (and, e.g., the flange) thus form a volume within which the cylindrical mounting member and the valve member are located. Thus preferably the housing, e.g. preferably the flange, comprises one or more apertures, e.g. a plurality of apertures, to allow fluid to flow through the housing, e.g. through the flange, and into the downstream side of the conduit. Preferably the one or more apertures in the flange are provided within the area for which the housing defines a perimeter when it is attached to the flange.

Preferably the one or more (preferably between two and eight) apertures, e.g. in the flange, have a (e.g. combined) cross sectional area for the fluid flow so to not restrict the fluid flow, e.g. further than the restriction provided by the valve aperture and valve member. Thus preferably the one or more apertures have a greater (e.g. total) cross sectional area than the maximum cross sectional area for fluid flow between the valve member and the valve aperture when the valve aperture is fully open. In a preferred embodiment the one or more apertures undercut the (outside of the) cylindrical mounting member. This helps to maximize the fluid flow through the device and into the downstream side of the conduit. Thus preferably the outer dimension of the cylindrical mounting member (in a direction perpendicular to the direction in which the cylindrical mounting member extends) is further from the central axis of the cylindrical mounting member than the internal edge (i.e. the edge of (e.g. each of) the one or more apertures that is closest to the central axis of the cylindrical mounting member) of (e.g. each of) the one or more apertures.

The valve member, which is movably mounted on the outside of the cylindrical mounting member, may be arranged in the device in any suitable and desired way in which it achieves its purpose of moving in a reciprocal manner to open and close the valve aperture, to thereby control flow of the fluid through the valve aperture. For example the valve member may comprise a sheath on the outside of the cylindrical mounting member. Thus preferably the valve member is mounted coaxially on the outside of the cylindrical mounting member. Also preferably the valve member comprises an annular cross section (in a plane perpendicular to the axis of the valve member and, e.g. the device), e.g. at least for the portion of the valve member that is mounted on the cylindrical mounting member, e.g. preferably the valve member comprises a longitudinally extended annulus (e.g. extended in a direction parallel to the axis of the valve member and, e.g. the device).

In a preferred embodiment the (movement of the) valve member is (e.g. solely) guided by the (outer surface of the) cylindrical mounting member, e.g. to align the valve member with the valve aperture. Thus, in preferred embodiments the valve member is both sealed on and guided by the outer surface of the cylindrical mounting member, e.g. the inner surface valve member and the outer surface of the cylindrical mounting member are configured to cooperate both to guide the valve member and to provide a location for the seal between the inner surface valve member and the outer surface of the cylindrical mounting member.

In one embodiment the device comprises one or more bearing strips between the cylindrical mounting member and the valve member. The one or more bearing strips help to guide the valve member and to reduce friction and wear. Preferably the one or more bearing strips are located in one or more (e.g. circumferentially extended) grooves in the (outer surface of the) cylindrical mounting member. Preferably the one or more bearing strips comprise a plastic (e.g. polytetrafluoroethylene (PTFE)). Preferably the one or more bearing strips each have a thickness (e.g. in the radial direction) of approximately 2 mm.

As has been described, preferably the valve member moves in a direction parallel to the axis of the cylindrical mounting member and, e.g. to the axis of the device and/or to the conduit, e.g. coaxial about the cylindrical mounting member. Thus preferably the valve member is arranged to move in a direction perpendicular to the plane of the valve aperture. The valve member may be any suitable and desired cross sectional shape (in a directional perpendicular to its axis), for moving in a reciprocal manner on the outside of the cylindrical mounting member. Preferably the inner surface of the valve member has the same cross sectional shape as the outer surface of the cylindrical mounting member, e.g. circular. Such an arrangement facilitates the reciprocal motion of the valve member.

Preferably the part of the valve member, e.g. the end of the valve member closest to the valve aperture, that engages with the valve aperture has the same cross sectional shape as the shape of the valve aperture, e.g. circular. The valve member may engage with the valve aperture, i.e. it may seal the valve aperture, in any suitable and desired way. In a preferred embodiment the valve member comprises an end cap, e.g. lying substantially in a plane perpendicular to the axis of the valve member, e.g. and parallel to the plane of the valve aperture, that is arranged to open and close the valve aperture, e.g. seal against the valve aperture when closed. Thus in a particularly preferred embodiment the valve member comprises a sheath and an (e.g. disc-shaped) end cap at the end of the sheath (at the end proximal to the valve aperture), wherein the end cap lies substantially in a plane perpendicular to the direction in which the sheath extends.

Preferably the (e.g. end cap of the) valve member is arranged to seal (when the valve member closes the valve aperture) against the downstream side of the valve aperture, preferably against the downstream planar face of the (e.g. housing that defines the) valve aperture.

The end cap of the valve member may be flat but preferably the end cap comprises a planar outer portion (e.g. in a plane perpendicular to the axis of the valve member, e.g. and parallel to the plane of the valve aperture) that is arranged to seal against, e.g. flush with, the (e.g. planar) downstream side (face) of the valve aperture when the valve member closes the valve aperture and a central portion that projects from the planar outer portion (e.g. in a direction towards to the valve aperture) and which protrudes at least partially through the valve aperture when the valve member closes the valve aperture. Preferably the central portion has a planar face (e.g. in a plane perpendicular to the axis of the valve member, e.g. and parallel to the plane of the valve aperture).

This stepped arrangement of the end face of the valve member helps to provide an effective seal with the valve aperture when it is closed. It also helps to reduce the contact force between the end face of the valve member and the valve member such that the valve member is easily lifted off the valve aperture (when the differential pressure allows), i.e. it does not become stuck owing to suction. Preferably the planar outer portion and/or preferably the central portion are shaped such that they engage with and seal against the shape of the valve aperture. Thus preferably the planar outer portion is a planar outer annulus and/or preferably the central portion is circular, e.g. to engage with and seal against the preferred shape of the valve aperture. Preferably the projecting central portion has a cross sectional area, and e.g. a diameter, that is (e.g. slightly) smaller than the cross sectional area of the valve aperture. Preferably the edges of the projecting central portion are rounded. This may help the valve member to engage smoothly with the valve aperture and to provide an aerodynamic flow path through the valve aperture and past the valve member.

The control volume may be defined between the cylindrical mounting member and the valve member in any suitable and desired way. The cylindrical mounting member may be solid, such that the control volume is bounded by the end of the cylindrical mounting member and the (inner) end of the valve member, e.g. the (inner surface of the) end cap. However, in a preferred embodiment the cylindrical mounting member comprises a central bore that forms at least part of the control volume. Preferably the central bore is cylindrical, e.g. coaxial with the cylindrical mounting member and, e.g., having a circular cross-section. Thus preferably the cylindrical mounting member comprises a cylindrical annulus.

Providing a hollow cylindrical mounting member, i.e. with a central bore as at least part of the control volume (in addition to the part of the control volume between the end of the cylindrical mounting member and the (inner) end of the valve member), helps to maximize the volume of the control volume (and thus increases the control on the valve member) and also helps to provide a control volume even when the valve member is fully open, e.g. such that the end cap of the valve member is abutting the end of the cylindrical mounting member.

In a preferred embodiment the cylindrical mounting member and the valve aperture define only a single control volume, e.g. preferably the device has only a single control volume. This helps to simplify the design of the device.

Preferably the (e.g. maximum) cross sectional area of the control volume (e.g. in a plane perpendicular to the axis of the device) that acts on the (inner surface of the) end cap of the valve member is greater than the (e.g. minimum) cross sectional area of the valve aperture (e.g. in a plane perpendicular to the axis of the device). This helps to increase the control of the valve member from the control pressure in the, e.g. single, control volume. Preferably the cross sectional area of the control volume has its maximum between the end of the cylindrical mounting member and the end cap of the valve member, e.g. rather than within the bore of the cylindrical mounting member, and preferably at the (inner) face of the end cap of the valve member.

When the cylindrical mounting member comprises a central bore, preferably the device comprises a biasing member, e.g. a (e.g. helical) spring, arranged in the bore within the cylindrical mounting member and arranged to bias the valve member towards the valve aperture. The central bore of the cylindrical mounting member provides a convenient location with a relatively large unobstructed volume into which the biasing member may be located. Thus, in this embodiment, the valve member is acted on by the pressure of the upstream side, the control pressure and the force of the biasing member so as to be moved by the resultant force on the valve member. This may help to reduce instability of the device which causes oscillation of the downstream pressure for a fixed control pressure. In use the biasing member may be arranged to prevent or reduce rebound and/or oscillation of the valve member.

Preferably the biasing member (e.g. a spring) acts on a side of the valve member opposite to the valve aperture. This may enable the biasing member to exert a force on the valve member that opposes the force of the inlet pressure through the valve aperture.

The arrangement for introducing a control pressure into the control volume may comprise any suitable and desired arrangement for introducing the control pressure into the control volume (thus preferably the arrangement is in fluid communication with the control volume). In one set of embodiments the control pressure comprises a fluid pressure, e.g. a gas pressure. The arrangement could introduce a fixed control pressure into the control volume. However, in a preferred embodiment the arrangement comprises an arrangement for introducing and controlling a control pressure in the control volume. In this embodiment the control arrangement may comprise any conventional pressure regulating device, e.g. a pilot pressure regulator or a solenoid valve.

The control arrangement, e.g. the pilot pressure regulator, may be provided externally or internally to the conduit in which the device is placed and is preferably provided external to the main components (i.e. the cylindrical mounting member, the valve member and the valve aperture) of the device. Providing a control arrangement, e.g. a pilot pressure regulator, internally within the conduit allows the whole device to be housed within a conduit with no external protrusions, which will be appreciated to be of great advantage in a complex pipework system in which space is at a premium, and allows the device to be retrofitted easily into an existing system, e.g. within existing pipework or at a flanged interface. Providing a control arrangement, e.g. a pilot pressure regulator, external to the conduit allows easy access to the control arrangement.

In a preferred embodiment the arrangement introduces the control pressure through the cylindrical mounting member and into the control volume. When the cylindrical mounting member is attached to, e.g. integrally formed with, a flange, preferably the control pressure is introduced into the control volume through the flange. Thus preferably the flange comprises a duct (between the arrangement and the control volume) in fluid communication with the arrangement and with the control volume, wherein the arrangement introduces the control pressure into the control volume through the duct. Also preferably, the (e.g. control) arrangement is attached to the flange, e.g. external to the conduit.

The control pressure set by the (e.g. control) arrangement, e.g. the pilot pressure regulator, may be derived from an external secondary source, e.g. an air supply which is controlled using a valve, tap, knob, etc., or even remotely, or the control pressure may be regulated directly from the pressure upstream and/or downstream from the device, e.g. via the control arrangement, e.g. the pilot pressure regulator.

The former alternative (using a secondary source to determine the pressure set by the control pressure control means, e.g. a pressure regulator) is useful when a predetermined value for the downstream pressure is required, i.e. the secondary source can be set to deliver the desired control pressure to the control volume. The latter alternative (determining the pressure set by reference to the upstream pressure) is useful when the downstream pressure is required to vary in accordance with variations in the upstream pressure, e.g. to set a predetermined pressure drop or predetermined ratio between the upstream and downstream pressures. For example, if the input pressure varies between 20 bar and 40 bar, and the pressure control arrangement, e.g. the pilot pressure regulator, is arranged to deliver a control pressure which is half of the upstream pressure, in order to enable the device to control the downstream pressure to be half of the upstream pressure; if the upstream pressure is 20 bar, the control pressure is set at 10 bar, and if the upstream pressure is 40 bar, the control pressure is set at 20 bar.

In one embodiment the control arrangement is in fluid communication with the downstream side of the device and arranged to set the control pressure dependent on the downstream pressure. This configuration may be used when it is desired to maintain the downstream pressure.

In another embodiment the control arrangement is in fluid communication with the upstream side of the device and arranged to set the control pressure dependent on the upstream pressure. In a further embodiment the control arrangement is in fluid communication with the upstream and downstream sides of the device and arranged to set the control pressure dependent on the upstream and/or downstream pressure, e.g. including dependent on the pressure difference between the upstream and downstream sides of the device.

When the control arrangement is arranged to set the control pressure dependent on the upstream and/or downstream pressure within the conduit, the control arrangement may be configured to be in fluid communication with the upstream and/or downstream pressure respectively in any suitable and desired way. In a preferred embodiment the device, e.g. the flange or the housing, comprises a duct therethrough, wherein the control arrangement senses the upstream and/or downstream pressure via the duct. Thus preferably the duct is in fluid communication with the control arrangement and the upstream and/or downstream side of the device as appropriate.

In a particularly preferred embodiment the control arrangement comprises a flow path, e.g. through the duct, from the upstream side of the device to the downstream side of the device, e.g. that bypasses the (main flow path through the) valve aperture. Preferably the, e.g., pilot pressure regulator controls the flow through the flow path so to set the control pressure. Preferably the control pressure is set, e.g. by the pilot pressure regulator, from a branch off the flow path through the control arrangement (and, as discussed, may be dependent upon one or both of the upstream and downstream pressures).

In one embodiment the control arrangement is arranged to create a pressure drop therethrough, e.g. in the flow path through the control arrangement. The pressure drop (e.g.

dependent on the rate of fluid flow through the flow path in the control arrangement) preferably allows the control pressure to be set dependent on pressure drop. For example, a greater pressure drop when there is greater flow through the flow path may cause the control pressure to be lower than the upstream pressure (which thus causes the valve member to open the valve aperture), e.g. the pressure differential between the control and the upstream pressures preferably depends on the pressure drop.

The pressure drop through the control arrangement may be achieved in any suitable and desired way, e.g. in a pilot pressure regulator itself. In a preferred embodiment the duct (through which the upstream or downstream pressure is sensed by the control arrangement) and/or the flow path through the control arrangement itself comprises a reduced cross sectional area (compared to another portion of the duct or flow path), e.g. a venturi or an orifice, that is arranged to induce a pressure drop.

In a particularly preferred embodiment the pressure drop is in the flow path through the control arrangement upstream of the pilot pressure regulator. Preferably the branch off the flow path to set the control pressure also comprises a pressure drop. This may help to limit the flow rate in and out of the control volume and thus help to regulate the changes in the control pressure, e.g. owing to changes in the upstream and/or downstream pressures, such that the rate of the valve member opening and closing may be controlled.

The seal, arranged between the outer surface of the cylindrical mounting member and the inner surface of the valve member, may be arranged to substantially seal the control volume in any suitable and desired way. Preferably the control volume is substantially sealed from the upstream and downstream sides (and thus pressures) of the device (and the conduit), and is thus preferably only in fluid communication with the control arrangement to introduce the control pressure into the control volume. This helps to isolate the control pressure from the upstream and/or downstream pressures.

In a preferred embodiment the seal is resiliently biased, e.g. between the between the outer surface of the cylindrical mounting member and the inner surface of the valve member. Resiliently biasing the seal may help to prevent fluid communication between the control volume and the upstream and downstream sides of the device, and may also help to prevent pressure loss from the control pressure in the control volume. Thus the (e.g. resiliently biased) seal may allow only a very small amount of fluid leakage therethrough, e.g. into or out of the control volume. However in a preferred embodiment the seal is arranged to allow no leakage therethrough.

However in some embodiments it may be desired for the control pressure not to be completely isolated from the upstream and downstream pressures, e.g. the control volume may not be completely sealed. In one embodiment the control volume comprises an orifice arranged in fluid communication with the upstream side of the device. In a preferred embodiment the (e.g. end cap of the) valve member comprises an orifice in fluid communication with the upstream side of the device. The orifice preferably introduces the pressure drop through the control arrangement, e.g. performs this function instead of the pressure drop in the duct through which the control arrangement is in fluid communication with the upstream side of the conduit. Thus in this embodiment, preferably the flow path through the control arrangement is via (i.e. the flow path includes) the control volume.

The device may have only a single seal arranged between the outer surface of the cylindrical mounting member and the inner surface of the valve member. However in a preferred embodiment the device comprises a plurality of seals (e.g. two seals) arranged (e.g. parallel to each other) between the outer surface of the cylindrical mounting member and the inner surface of the valve member. Having more than one seal provides some redundancy in the case that one of the seals may fail. It will be appreciated that the preferred and optional features described herein for a single seal apply equally to multiple seals.

Preferably the seal is arranged around the outer perimeter, e.g. circumference, of the cylindrical mounting member, e.g. in a plane perpendicular to the axis of the cylindrical mounting member and, e.g. the axis of the device. Thus preferably the seal comprises an annular seal. Thus also preferably the seal is arranged on the inner perimeter, e.g. circumference, of the valve member.

The seal may be arranged with respect to the cylindrical mounting member and the valve member in any suitable and desired way. In a preferred embodiment the cylindrical mounting member comprises a (e.g. annular) groove in the outer surface of the cylindrical mounting member, e.g. extending around the perimeter of the cylindrical mounting member, wherein the seal is arranged (e.g. press fitted) in the groove. Thus preferably the seal is substantially flush with the outer surface of the cylindrical mounting member, protruding only slightly from the outer surface to form a seal with the valve member. Thus preferably the seal does not affect the alignment of the valve member, e.g. relative to the cylindrical mounting member and/or the valve aperture.

It will be appreciated that in preferred embodiments the seal extends around the full outer perimeter, e.g. circumference, of the cylindrical mounting member. Thus preferably the valve member extends the full outer perimeter, e.g. circumference, of the cylindrical mounting member. As described above, preferably the valve member comprises a sheath arranged (e.g. to move reciprocally) coaxially around the cylindrical mounting member.

It will thus also be appreciated that owing to the sheathed configuration of the valve member, e.g. relative to the principal direction of the fluid flow (e.g. such that preferably the valve member is arranged on the upstream side of the cylindrical mounting member), preferably the seal does not become contaminated by the fluid.

The seal may be made from any suitable and desired material. In one embodiment the seal comprises an elastomer, e.g. nitrile, seal. In one embodiment the seal comprises polytetrafluoroethylene (PTFE) or polyurethane. In another embodiment the seal comprises a metal Such materials may help to allow the valve member (and/or cylindrical mounting member) to slide over the seal with a relatively low coefficient of friction and are compliant for positioning the seal in the groove (when the seal is located in a groove).

The seal may comprise any suitable and desired configuration. In one embodiment the seal comprises an O-ring. In another embodiment the seal comprises a U-ring.

The valve member may be acted on by the pressure of the upstream side and the control pressure in any suitable and desired way so as to be moved by the difference between these pressures. In a preferred embodiment the (e.g. end cap of the) valve member is exposed (e.g. directly) to the upstream pressure, e.g. through the valve aperture. The valve member may be acted on solely by the pressure of the upstream side and the control pressure so as to be moved solely by the difference between these pressures. However, as discussed above, in some embodiments the device comprises a biasing member arranged to bias the valve member towards the valve aperture. Thus, in these embodiments, the valve member is acted on by the pressure of the upstream side, the control pressure and the force of the biasing member so as to be moved by the resultant force (of the pressure of the upstream side, the control pressure and the force of the biasing member) on the valve member.

The device (and the components thereof) may be made from any suitable and desired material, e.g. depending on its intended use. In one embodiment the cylindrical mounting member, the valve member and the valve aperture (and, e.g., the housing) are made of plastic, e.g. polyoxymethylene (acetal). Such materials are relatively inexpensive and easy to work with. Plastic components are particularly suitable when the device is used to control the flow of water through a conduit.

In another embodiment the cylindrical mounting member, the valve member and the valve aperture (and, e.g., the housing) are made of metal, e.g. stainless steel. This provides a stronger (than plastic) device which may therefore be suitable for controlling larger fluid flows and/or controlling greater pressures. Metal components are particularly suitable when the device is used to control the flow of oil or gas through a conduit.

When the main components are made from metal, preferably the valve member comprises a plastic (e.g. polytetrafluoroethylene (PTFE)) seal that is arranged to engage with the valve aperture when the valve aperture is closed. This seal helps to provide compliance with the valve aperture and thus help to provide a tight seal of the valve member against the valve aperture when it is fully closed. Preferably the plastic seal is arranged in a recess in the end cap of the valve member. Preferably the plastic seal is held in place by a (e.g. metal) plate attached (e.g. screwed) to the end cap (e.g. on the side proximal to the valve aperture). Preferably the plate is arranged to project through the valve aperture so that the seal engages with the valve aperture when the valve aperture is closed.

The device (and the components thereof) may be manufactured in any suitable and desired way, e.g. from plastic or metal. In a preferred embodiment the cylindrical mounting member, the valve member and the valve aperture (and, e.g., the housing) are machined, e.g. from solid pieces of, e.g. plastic or metal. Machining the parts, e.g. as opposed to casting them, is advantageous as it helps to manufacture the components precisely, so that they are aligned within a suitable and desired tolerance. It also avoids the need to have stock of, to ship in or to make castings, all of which are expensive. Furthermore, it is difficult to manufacture precision components, e.g. to ensure they are aligned, when casting.

It will thus be appreciated that in preferred embodiments, two machined parts (the valve member and the valve aperture) interact directly to provide the seal when the device is closed, which thus helps to provide an effective seal. Furthermore, providing a machined cylindrical mounting member and valve member (and preferably also a machined valve aperture), helps to provide precise alignment for the valve member with the aperture when the valve member closes and seals the valve aperture.

In a preferred embodiment (e.g. each of) the machined parts of the device are machined from a solid block that requires no undercutting, i.e. preferably each of the parts is shaped such that when they are being machined on an internal surface there is always a line of sight clear such that the machining tool only ever moves inwards and not back outwards from the internal surface.

The device may be any suitable size and mass e.g. depending on the application of the device and the material from which it is made. For example, the diameter of the device, e.g. of the housing, may be between 100 mm and 400 mm; the length of the device, e.g. of the housing and the flange, may be between 90 mm and 350 mm; the diameter of the valve member may be between 30 mm and 240 mm; and the total mass of the device may be between 0.8 kg and 35 kg (when made from plastic, e.g. acetal) or between 4 kg and 200 kg (when made from metal, e.g. stainless steel).

In a preferred embodiment the diameter of the device, e.g. of the housing, is approximately 160 mm; the length of the device, e.g. of the housing and the flange, is approximately 130 mm; the diameter of the valve member is approximately 35 mm and the cylindrical mounting member, the valve member and the valve aperture (e.g. the whole device) have a total mass of less than 5 kg, e.g. approximately 2.5 kg (when made from plastic, e.g. acetal) or less than 25 kg, e.g. approximately 14 kg (when made from metal, e.g. stainless steel). It will be appreciated that this is significantly less than the conventional pressure regulators described above.

Devices in accordance with the present invention are suitable for almost any mass flow rate and pressure from very low to very high, e.g. from the order of Pa to MPa. This large range of pressures can be accommodated because the control of the device simply depends on the control-upstream pressure differential which acts on the valve member. This control also enables embodiments of the device to adjust the mass flow rate or the pressure drop by a large range, e.g. the ratio of the maximum to the minimum pressure ratio across the device is very large. Therefore the device is suitable for many different uses and applications. With conventional devices it was not previously possible to deliver high mass flow rates through a pressure regulator without computer control, but embodiments of the invention enable this. Similarly, devices in accordance with the invention are scalable to any size, e.g. for fitting into pipe diameters of a few millimetres to ones of several metres.

As will be appreciated devices in accordance with the present invention are suitable for many different applications when pressure regulation of a fluid flow is needed including, but not limited to, clean or shop air in industrial applications, process fluids in an industrial plant, transmission pipelines to transport fluids such as water, oil and gas, mixtures of transport fluids, e.g. partially mixed oil and water mixtures, plant heating system applications, etc.

Certain preferred embodiments of the invention will now be described, by way of example only, with reference to the accompanying drawings in which:

FIG. 2 shows two isometric views of the device shown in FIG. 1;

There are many different industrial situations in which there is a desire to regulate the pressure in a fluid flow stream through a pipe or conduit. In such systems there is an input pressure that may be constant or fluctuating in time and which it is desired to control to a lower target output pressure, which also can be constant or fluctuating. As will now be described, embodiments of the present invention provide devices that are able to provide this control for the fluid flow.

Figure 1:
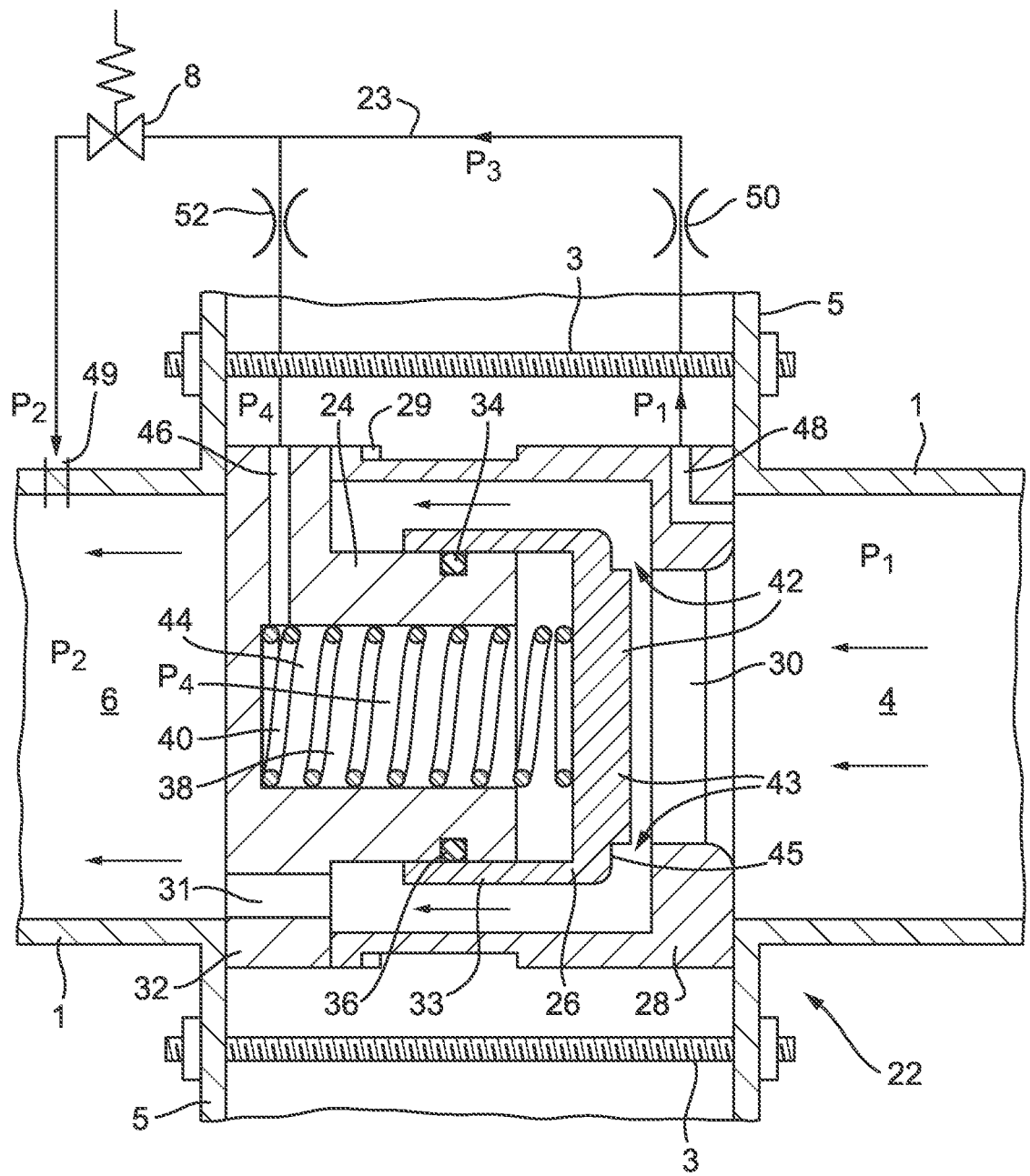
FIG. 1 shows a cross sectional view of a device, along with a schematic of a control loop, in accordance with an embodiment of the invention.

FIG. 1 shows a cross sectional view of a device 22, along with a schematic of a control loop 23, in accordance with an embodiment of the invention. FIG. 2 shows isometric views of the device 22 shown in FIG. 1.

In FIG. 1 the fluid flow is from right to left through an upstream side 4 of the conduit, through the device 22 and into a downstream side 6 of the conduit 1. The device 22 is mounted in the conduit 1 at a flange 5 between the upstream and downstream sides 4, 6, where it is clamped in place by means of a flange bolt circle 3.

The device 22 comprises three main components: a cylindrical mounting member 24, a valve member 26 and a housing 28 that defines a valve aperture 30. Each of these components is machined from a respective solid piece of acetal. The cylindrical mounting member 24 is integrally formed, and projects perpendicularly from, a flange 32 that is used to mount the device 22 in the conduit. The housing 28 is attached to and sealed against the flange 32 by means of a number of bolts 29. The housing 28 and the flange 32 are machined and attached to each other so that the valve member 26 is precisely aligned with the valve aperture 30.

The device 22 is clamped between the upstream and downstream sections of the conduit 1 by means of a flange bolt circle 3, with flanges 5 on the upstream and downstream sections of the conduit 1 engaging against the flange 32 of the device 22 on the downstream side and the housing 28 on the upstream side.

As can be seen more clearly in FIG. 2, apertures 31 in the flange 32 allow a flow path for fluid from the inside of the housing 28 and into the downstream side 6 of the conduit 1.

The valve member 26, which has a cylindrical sheath portion 33 and an end cap 42, is mounted on the outside of the cylindrical mounting member 24 such that it is able to move reciprocally along the outer surface of the cylindrical mounting member 24. The valve member 26 can thus move between a position in which the end cap 42 is sealed against the inner face of the housing 28 to fully close the valve aperture 30, and a position in which the inner (though the spring force exerted by the spring 40 may be arranged to prevent this). The end cap 42 of the valve member 26 has a stepped outer face with a central portion 43 that is arranged to project through the valve aperture 30 when fully closed and an planar outer annulus 45 that is arranged to engage with and seal against the inner face of the housing 28 when the valve aperture 30 is fully closed.

An annular seal 34 is positioned in a groove 36 in the outer surface of the cylindrical mounting member 24 so that it provides a seal between the outer surface of the cylindrical mounting member 24 and the inner surface of the valve member 26.

The cylindrical mounting member 24 has a hollow central bore 38 in which a helical spring 40 is located. The spring 40 is positioned between the end of the central bore 38 against the flange 32 and the end cap 42 of the valve member 26. Between them, the valve member 26 (i.e. its cylindrical sheath portion 33 and end cap 42) and the cylindrical mounting member 24 (with its hollow central bore 38) define a control volume 44, which is sealed by the annular seal 34. The control volume 44 has a central portion within the hollow central bore 38 of the cylindrical mounting member 24 and a portion with a greater cross sectional area adjacent the end cap 42 of the valve member 26, i.e. beyond the end of the cylindrical mounting member 24.

A duct 46 that is drilled through the flange 32 provides fluid communication between the control volume 44 and a pilot pressure regulator 8 to allow the pilot regulator 8 to introduce, i.e. to set, a control pressure in the control volume 44. A second duct 48 that is drilled through the housing 28 provides the pilot pressure regulator 8 with fluid communication with the upstream side 4 of the conduit 1 and a third duct 49 that is drilled through the flange 32 (though for the purposes of clarity this is shown schematically in FIG. 1 as entering directly into the downstream side 6 of the conduit 1) provides pilot pressure regulator 8 with fluid communication with the downstream side 6 of the conduit 1, so that the pilot pressure regulator 8 can use the upstream and downstream pressures to set the control pressure in the control volume 44, as will be described.

As shown schematically in FIG. 1, the pilot pressure regulator 8 is arranged in a control loop 23 on the outside of the conduit 1 and is arranged to deliver a control pressure $P_4$ to the device 22 via the duct 46 into the control volume 44. The pilot pressure regulator 8 is also in fluid communication with the upstream pressure $P_1$ on the upstream side 4 of the conduit 1 via the duct 48 through the housing 28, and in fluid communication with the pressure $P_2$ on the downstream side 6 of the conduit 1 via the duct 49 through the flange 32. This provides a fluid flow path through the control loop 23 that bypasses the valve aperture 30 of the device 22. The pilot pressure regulator 8 is positioned in this fluid flow path of the control loop 23, with the duct 46 into the control volume 44 branching off upstream of the pilot pressure regulator 8.

The control loop 23 also includes a first orifice 50 that provides a restriction in the duct 48 between the upstream side 4 of the conduit 1 and the pilot pressure regulator 8 (such that the pressure in the control loop 23 downstream of the first orifice 50 is $P_3$), and a second orifice 52 that provides a restriction in the duct 46 between the control volume 44 and the pilot pressure regulator 8.

Operation of the device 22 will now be described with reference to FIGS. 1 and 2. In this example, the pilot pressure regulator 8 is set dependent on the pressure $P_2$ in the downstream side 6 of the conduit 1 (though it will be appreciated that other arrangements are possible). With no flow of fluid through the conduit 1 or the device 22, i.e. a low upstream and downstream pressure in the conduit 1, the control pressure in the control volume 44 and the spring force of the spring 40 act on the end cap 42 of the valve member 26 to bias the valve member 26 into a position in which the end cap 42 is sealed against the inner face of the housing 28 to fully close the valve aperture 30.

When fluid flow commences in the conduit 1, the fluid will flow in the upstream side 4 of the conduit 1 and exert a force against the end cap 42 of the valve member 26 owing to the pressure $P_1$ in the upstream side 4 of the conduit 1. The upstream pressure $P_1$ will also create a flow of fluid through the control loop 42, such that the flow through the first orifice 50 creates a pressure drop across it, i.e. $P_1$-$P_3$. This pressure drop causes the pressure $P_4$ in the control volume 44 to be lower than the pressure $P_1$ in the upstream side 4 of the conduit 1, which causes the valve member 26 to be pushed back from and to open the valve aperture 30, allowing flow of the fluid through the valve aperture 30, through the device 22 and into the downstream side 6 of the conduit 1 via the apertures 31 in the flange 32.

While the upstream pressure maintains such a value, the valve member 26 will keep the valve aperture 30 at least partially open and thus allow fluid to flow through the device. When the upstream pressure $P_1$ increases the effect will be two-fold. First, the increased upstream pressure will act on the end cap 42 of the valve member 26 to push it back against the control pressure in the control volume 40 and thus open the valve aperture 30 further. However, simultaneously, owing to the flow through the device, the downstream pressure $P_2$ will also increase. This increase in the downstream pressure $P_2$, which is used to set the pilot pressure regulator 8, causes the pilot pressure regulator 8 to close and thus to decrease the fluid flow through (and increase the pressure $P_3$ in) the control loop 23. This causes the pressure drop across the first orifice 50 to be smaller, which will accordingly set a higher control pressure $P_4$ (relative to the upstream pressure $P_1$) in the control volume 44. This increased control pressure $P_4$ will thus balance against the increased upstream pressure such that the valve member 26 settles (i.e. closes) to a position where it is pressure balanced. This will thus act to regulate the upstream pressure that is experienced in the downstream side 6 of the conduit 1.

(The action of the second orifice 52 is to limit the flow rate in and out of the control volume 44 to thus regulate the change in the control pressure $P_4$, so that the rate of the valve member 26 opening and closing may be controlled.)

It will be appreciated that the that in this way the device acts to regulate the pressure in the downstream side 6 of the conduit 1, owing to the fact that the valve member 26 moves under a pressure difference until it settles to a position where it is pressure balanced.

Figure 3:
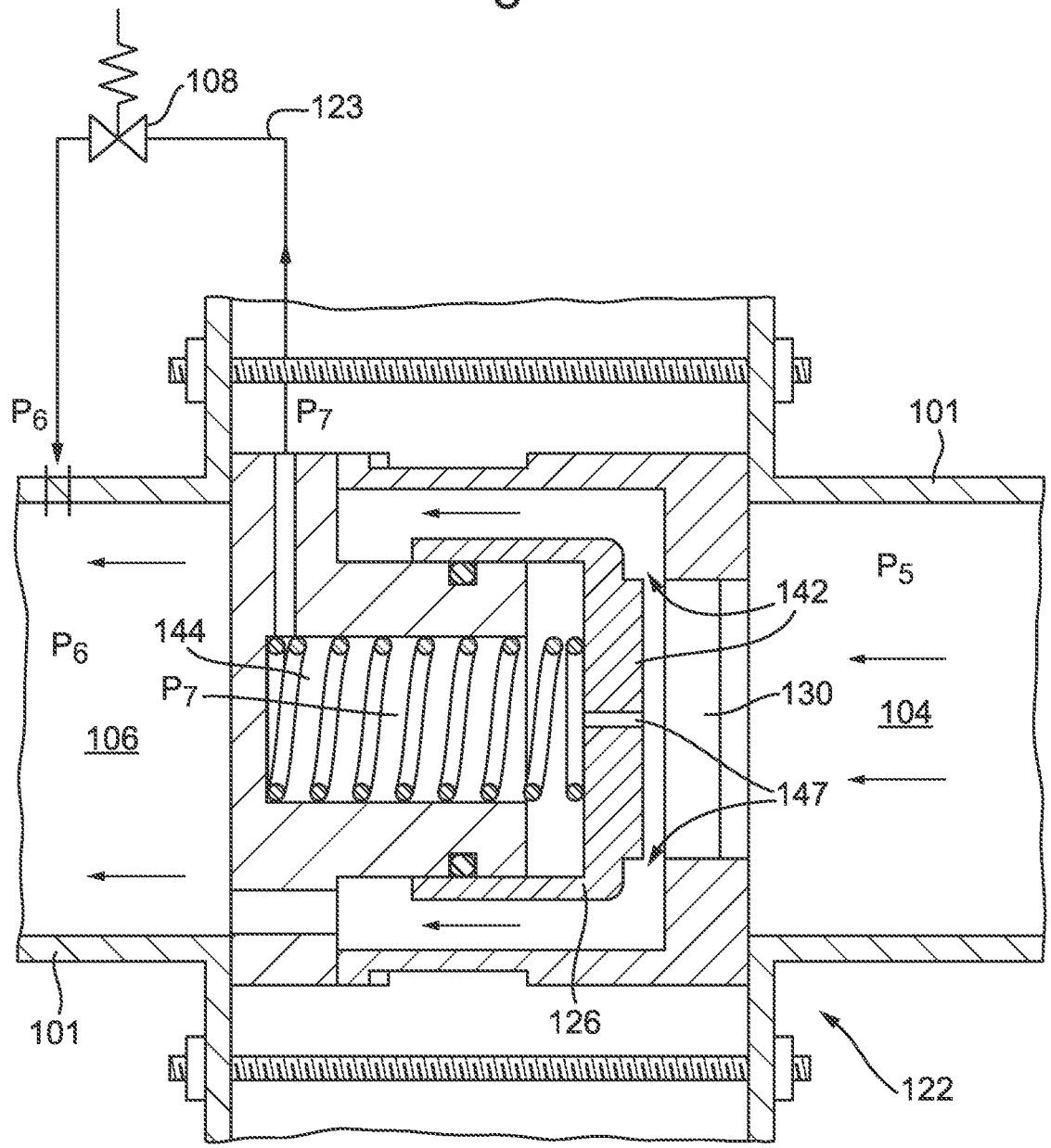
FIG. 3 shows a cross sectional view of a device in accordance with another embodiment of the invention.
Figure 4:
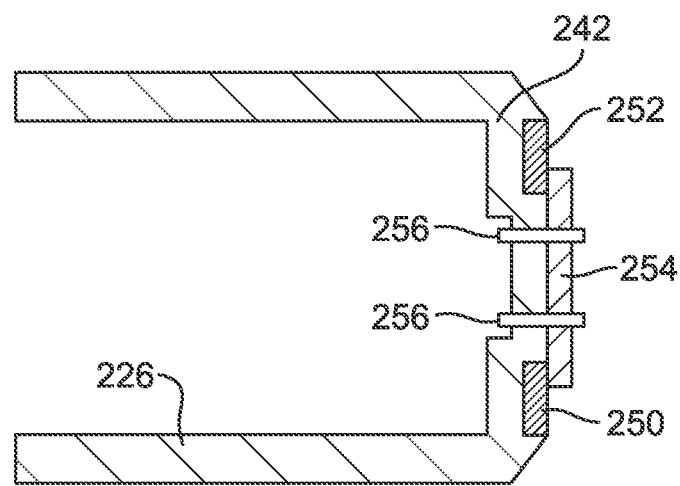
FIG. 4 shows a cross sectional view of a valve member for use with a device in accordance with another embodiment of the invention.

FIG. 3 shows a cross sectional view of a device 122 in accordance with another embodiment of the invention. The device 122 shown in FIG. 4 is almost identical to the device shown in FIGS. 1 and 2, except that the end cap 142 of the valve member 126 contains a small orifice 147 in its centre, which replaces the first orifice 50 and the duct 48 in the device 22 of FIGS. 1 and 2, and forms part of a control loop 123 with the pilot pressure regulator 108, i.e. the orifice 147 in the end cap 142 allows a small amount of fluid flow directly into the control volume 144. Furthermore, the control loop 123 of the device 122 in FIG. 3 does not include a second orifice between the pilot pressure regulator 108 and the control volume 144.

Operation of the device 122 shown in FIG. 3 is almost identical to that described for FIGS. 1 and 2, except that the pressure $P_7$ in the control volume 144 depends on the pressure drop across the orifice 147 in the end cap 142 (which depends on the upstream pressure $P_5$) and the action of the pilot pressure regulator 108 (which depends on the downstream pressure $P_6$). Thus, in the same manner to the operation of the device shown in FIGS. 1 and 2, when the downstream pressure $P_6$ is low (compared to the upstream pressure $P_5$), the valve member 126 will open, allowing more flow through the valve aperture 130 from the upstream side 104 of the conduit 101 into the downstream side 106 of conduit 101.

This results in an increased downstream pressure $P_6$, causing the pilot pressure regulator 108 to close, increasing the control pressure $P_7$, such that the valve member 126 acts to close the valve aperture 130 and to restrict the fluid flow therethrough, thus regulating the downstream pressure $P_6$.

FIG. 4 shows a cross sectional view of a valve member 226 for use with a device in accordance with another embodiment of the invention. In this embodiment, the device has a very similar design to that shown in FIGS. 1, 2 and 3, except that its main components are made from stainless steel rather than acetal. Thus in this embodiment the valve member 226 is substantially made from stainless steel.

In order to provide a compliant and thus effective seal against the valve aperture, the valve member 226 in FIG. 4 comprises an annular PTFE seal 250 arranged in a recess 252 in the end cap 242 of the valve member 226. In order to secure the seal 250 in place, a stainless steel plate 254 is attached to the end cap 242, by means of screws 256 on the side proximal to the valve aperture. The plate 254 is arranged to project through the valve aperture so that the seal 250 engages with the valve aperture when the valve aperture is closed.

Operation of the device having the valve member 226 shown in FIG. 4 is almost identical to that described for FIGS. 1 to 3.

It will be appreciated that the embodiment of the valve member 226 shown in FIG. 4 can equally well used in the devices shown in FIGS. 1, 2 and 3.

Figure 5:
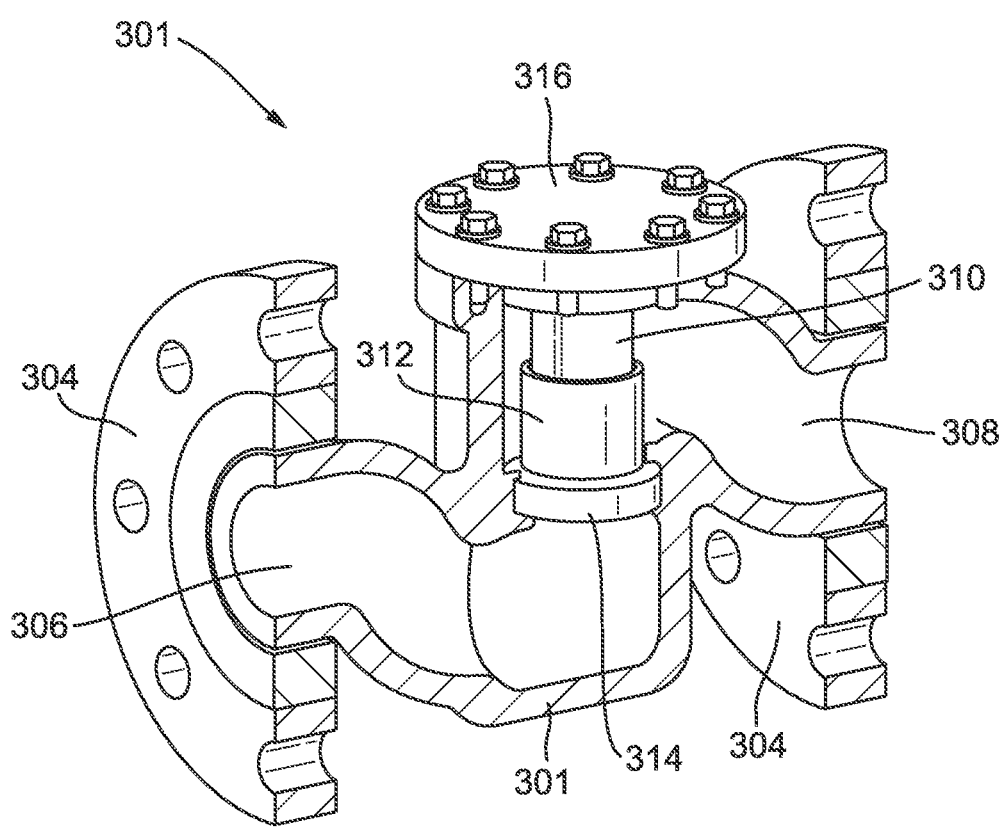
FIG. 5 shows an internal view of a device in accordance with another embodiment of the invention.

FIG. 5 shows an internal view of a device 301 in accordance with another embodiment of the invention. In this embodiment the device 301 is arranged in a conventional cast body 302 which, by means of two flanges 304, is able to be connected to upstream and downstream sections of a conduit.

In FIG. 5 the fluid flow is from left to right through an upstream side 306 of the conduit, through the device 302 and into a downstream side 308 of the cast body 302. As in the embodiments shown in FIGS. 1-4, the device 301 shown in FIG. 5 comprises three main components: a cylindrical mounting member 310, a valve member 312 and a valve aperture 314. The cylindrical mounting member 310 projects perpendicularly from a flange 316 that is used to mount the device 302 in the cast body 302. At the other end of the device, the valve aperture 314 is defined by an annulus that is held between the two sides of the cast body 302.

Operation of the device 301 shown in FIG. 5 is very similar to the operation of the embodiments of the device shown in FIGS. 1-4, except that when the fluid has passed through the valve aperture 314, the flow exits perpendicularly to the cylindrical axis of the device 301 into the downstream side 308 of the cast body 302.

It can be seen from the above that in at least preferred embodiments of the invention, the device provides control for the fluid flow through a conduit with a particularly simple design, having only three basic components and only a single moving part. This simplicity helps to provide a robust and reliable device, which may be manufactured inexpensively and compactly, e.g. compared to the complicated, expensive and bulky prior art pressure regulators. Also, with only three main components, the valve member and valve aperture, particularly when the valve aperture is defined in a housing, may be aligned precisely. Having a single valve aperture reduces the risk of blockages and sealing the control volume on the inside of the valve member (and thus the outside of the cylindrical mounting member) maximizes the control volume and thus the control of the device.

It will be appreciated by those skilled in the art that many variations and modifications to the embodiments described above may be made within the scope of the various aspects and embodiments of the invention set out herein. For example, the control pressure may be set dependent on the upstream pressure or by a device other than the pilot pressure regulator, e.g. to deliver a fixed control pressure.

The invention claimed is:

1. A device for controlling the flow of a fluid through a conduit from an upstream side of the device to a downstream side of the device, the device comprising:

a valve aperture;

a cylindrical mounting member arranged on a downstream side of the valve aperture;

a valve member movably mounted on an outside of the cylindrical mounting member and arranged to move reciprocally to selectively open and close the valve aperture, thereby controlling flow of the fluid through the valve aperture;

a control volume arranged to receive a control pressure for acting on the valve member, wherein the device comprises no more than one control volume for receiving the control pressure that acts on the valve member, and wherein the control volume is defined between the cylindrical mounting member and the valve member;

a control conduit for introducing the control pressure into the control volume; and a flange for mounting the device within the conduit, wherein the cylindrical mounting member is attached to the flange and wherein the flange comprises one or more apertures to allow fluid to flow through the flange and into a downstream side of the conduit;

wherein the valve member is acted on by a pressure of the upstream side and the control pressure so as to be moved by a difference between these pressures.

2. The device as claimed in claim 1, wherein the cylindrical mounting member, the valve member and the valve aperture are arranged coaxially with respect to each other about an axis that extends in a direction collinearly with the general direction of fluid flow through the valve aperture.

3. The device as claimed in claim 1, wherein the axis of the device is parallel to an axis of the conduit in which the device is arranged.

4. The device as claimed in claim 1, wherein the valve aperture lies in a plane perpendicular to the axis of the cylindrical mounting member.

5. The device as claimed in claim 1, wherein the device comprises a housing, wherein the housing comprises a wall in which the valve aperture is defined, and wherein the housing is attached to the cylindrical mounting member.

6. The device as claimed in claim 1, wherein the downstream side of the valve aperture has a planar face in a plane perpendicular to an axis of the device.

7. The device as claimed in claim 1, wherein the device comprises a housing attached to the cylindrical mounting member via the flange, and wherein the housing comprises a wall in which the valve aperture is defined.

8. The device as claimed in claim 1, wherein the valve member is arranged to move in a direction perpendicular to the plane of the valve aperture.

9. The device as claimed in claim 1, wherein the valve member comprises an end cap lying substantially in a plane parallel to the plane of the valve aperture, and wherein the end cap is arranged to open and close the valve aperture.

10. The device as claimed in claim 1, wherein the cylindrical mounting member comprises a central bore that forms at least part of the control volume.

11. The device as claimed in claim 10, wherein the device comprises a spring arranged in the central bore within the cylindrical mounting member and arranged to bias the valve member towards the valve aperture.

12. The device as claimed in claim 1, further comprising a seal arranged between an outer surface of the cylindrical mounting member and an inner surface of the valve member, the seal being configured for substantially sealing the control volume, wherein the cylindrical mounting member comprises a groove in the outer surface of the cylindrical mounting member, extending around the perimeter of the cylindrical mounting member, and wherein the seal is arranged in the groove.

13. The device as claimed in claim 1, further comprising a seal arranged between an outer surface of the cylindrical mounting member and an inner surface of the valve member, the seal being configured for substantially sealing the control volume, wherein the seal is resiliently biased between the outer surface of the cylindrical mounting member and the inner surface of the valve member.

14. The device as claimed in claim 1, wherein the valve member is both sealed on and guided by the outer surface of the cylindrical mounting member.

15. A device for controlling the flow of a fluid through a conduit from an upstream side of the device to a downstream side of the device, the device comprising:

a cylindrical valve aperture;

a cylindrical mounting member arranged on a downstream side of the cylindrical valve aperture;

a valve member movably mounted on an outside of the cylindrical mounting member and arranged to move reciprocally relative to the cylindrical mounting member to selectively open and close the valve aperture, thereby controlling flow of the fluid through the valve aperture, wherein the valve member comprises a planar end that is arranged to extend fully over, and fit into, an area of the cylindrical valve aperture;

a control volume defined between the cylindrical mounting member and the cylindrical valve member; and a control conduit for introducing the control pressure into the control volume;

wherein the valve member is acted on by a pressure of the upstream side and the control pressure so as to be moved by a difference between these pressures.

16. A device for controlling the flow of a fluid through a conduit from an upstream side of the device to a downstream side of the device, the device comprising:

a valve aperture;

a cylindrical mounting member arranged on a downstream side of the valve aperture;

a valve member movably mounted on an outside of the cylindrical mounting member and arranged to move reciprocally to selectively open and close the valve aperture, thereby controlling flow of the fluid through the valve aperture;

a control volume arranged to receive a control pressure for acting on the valve member, wherein the device comprises no more than one control volume for receiving the control pressure that acts on the valve member, and wherein the control volume is defined between the cylindrical mounting member and the valve member; and a control conduit for introducing the control pressure into the control volume, wherein the control conduit is fluidly connected to a control pressure regulator for introducing and controlling the control pressure in the control volume;

wherein the valve member is acted on by a pressure of the upstream side and the control pressure so as to be moved by a difference between these pressures, and wherein the control pressure regulator is in fluid communication with the upstream side of the device and arranged to set the control pressure dependent on the upstream pressure.

\* \* \* \* \*